(12) United States Patent
Klein (10) Patent No.: US 6,263,101 B1
(45) Date of Patent: Jul. 17, 2001

(54) FILTERING IN PICTURE COLORIZATION

(75) Inventor: Louis Klein, Laguna Niguel, CA (US)

(73) Assignee: Cerulean Colorization LLC, Los Angeles, CA (US)

( * ) Notice: Subject to any disclaimer, the term of this patent is extended or adjusted under 35 U.S.C. 154(b) by 0 days.

(21) Appl. No.: 08/549,251

(22) Filed: Oct. 27, 1995

(Under 37 CFR 1.47)

Related U.S. Application Data

(63) Continuation-in-part of application No. 08/523,015, filed on Sep. 1, 1995, now abandoned.

(51) Int. Cl.⁷ .......................................... G06K 9/00
(52) U.S. Cl. ................... 382/162; 382/260; 382/218; 358/518
(58) Field of Search .................... 382/162, 166, 382/167, 260–265, 209, 217–221, 283; 345/431, 150–153; 348/33–34, 576–577, 650, 651; 358/518–523

(56) References Cited

U.S. PATENT DOCUMENTS

| | | |
|---|---|---|
| 3,771,155 | 11/1973 | Hayashi et al. . |
| 3,774,076 | 11/1973 | Weinger . |
| 4,021,841 | 5/1977 | Weinger . |
| 4,149,185 | 4/1979 | Weinger . |
| 4,156,237 | 5/1979 | Okada et al. . |
| 4,204,207 | 5/1980 | Bakula et al. . |
| 4,356,511 | 10/1982 | Tsujimura . |
| 4,357,624 | 11/1982 | Greenberg . |
| 4,360,831 | 11/1982 | Kellar . |
| 4,420,770 | 12/1983 | Rahman . |
| 4,509,043 | 4/1985 | Mossaides . |
| 4,606,625 | 8/1986 | Geshwing . |
| 4,642,676 | 2/1987 | Weinger . |
| 5,050,984 | 9/1991 | Geshwind . |
| 5,912,994 | * 6/1999 | Norton et al. ........................ 382/283 |
| 6,049,628 | * 4/2000 | Chen et al. .......................... 382/238 |

* cited by examiner

Primary Examiner—Bhavesh Mehta
(74) Attorney, Agent, or Firm—Oppenheimer Wolff & Donnelly LLP (57) ABSTRACT

Picture filtering technology generates mathematical mathematical models to represent photographic filters for application to digitized frames of picture stock. A desired filter is determined, and reference pictures, one taken with the filter and one taken without the filter, are selected from a picture library. The selected pictures are digitized and stored. The digitized pictures respectively comprise corresponding sets of pixels or digital data units between which a quantitative differencing is performed. The quantitative difference may be based on any number of variables, such as luminance. When the difference in the luminance values of each corresponding pair of pixels is determined, a mathematical model which is representative of this difference is generated. The mathematical model is essentially a mathematical model of the desired filter, "filtering" digital data in a substantially similar manner in which photographic filters affect light. The mathematical model is then applied to the digitized frame which is to be filtered, thereby modifying the luminance values of the pixels to effect the desired filtering of the image.

1 Claim, 6 Drawing Sheets

FILTERING IN PICTURE COLORIZATION

This application is a continuation-in-part of prior application Ser. No. 08/523,015 filed Sep. 1, 1995 now abandoned.

BACKGROUND OF THE INVENTION

1. Field of the Invention

The present invention relates to computerized picture reprocessing techniques and, more particularly, to the modification of colors of digitized picture stock by the application of mathematical models which are representative of photographic filters.

2. Description of Related Art

Film colorization, that is, colorizing black-and-white motion pictures, turned the film industry on its side in the mid-1980s. With less than adequate color selection and limited hardware and software capabilities, early attempts at colorizing notable black-and-white- film classics such as "Casablanca" and "The Big Sleep" produced less than favorable results, resulting in muddy hues that didn't always stick to the objects they were meant to color. Indeed, many film purists likened colorization to vandalism and defacement. However, in the 1990s a demand was created by the skyrocketing cost of producing new movies and television shows coupled with the burgeoning demand for movies and television shows to fill up time slots on the 500 or so cable channels, a demand which has been an incentive for colorizers to advance their craft to much higher levels of quality.

Colorizers have also applied their craft to more varied fields, fields which do not necessarily involve original black-and-white picture stock. For example, in the past if a director of a picture were unhappy with the color of a particular shot, the director would have had to reshoot the shot, which would have incurred high production costs. Further, commercial artists and advertisers may desire to intensify particular aspects of television commercials to be more appealing to consumers of target markets. Other special color effects may also be desired for a particular film, video, or television show, particularly music videos which are often intended for the less conservative teenage and young adult audience.

Other applications for the modification of digitized picture stock include the modification of the color of an entire digitized frame of the stock. For example, if a particular shot is shot during the day and the director later desires to have the shot be a night shot, then the entire shot would have to be reshot, incurring high costs. Furthermore, if a director of photography mistakenly used an improper filter or no filter at all for a particular shot, the shot would have to be completely redone with the desired filtered on the camera.

Accordingly, it is an object of the present invention to provide filtering techniques for modifying digitized picture stock.

SUMMARY OF THE INVENTION

Picture filtering technology of the present invention provides a method for modifying the color of digitized picture stock with mathematical filtering techniques. Generally speaking, picture filtering provides a method for modifying colors of a frame of picture stock by firstly digitizing the frame and storing the digitized frame in a computer. Two reference pictures are then selected from a picture or film library which are substantially identical, with one of the pictures having been shot with a filter and the other picture having been shot without a filter. The two reference pictures are digitized so that each set of resultant digital data or pixels corresponds to the set of pixels from the other reference picture. A quantitative differencing is then performed on a pixel-by-pixel basis, thereby determining the difference in, for example, the luminance value of each unfiltered pixels with each corresponding filtered pixel. In other words, for every variation of luminance value of the unfiltered picture there is then a corresponding quantitative difference value which, when multiplied with (or performed with some other arithmetic function) the unfiltered value, will yield the corresponding filtered value.

Accordingly, upon completing the quantitative differencing, a mathematical model is generated which is substantially a mathematical representation of the photographic filter used in the reference pictures. The mathematical model may be a function of any number of color variables, but in many applications, luminance values suffice for accurate filtering of images. The mathematical model is then applied to the digitized frame of the shot to be filtered by "feeding" the digital data through the mathematical model, thereby yielding "filtered" digital data. This process is analogous to light passing through a photographic filter, which light is filtered and recorded upon the exposed film. The filtered frame may then be viewed and further modified as desired. The change effected by the mathematical model may then be interpolated through other frames of the shot or applied to as many frames as desired.

One of the advantages of the filtering technology of the present invention is that if, for example, a director is unhappy with the overall color effect of a particular shot, rather than incur the great production cost of reshooting the shot, the shot may be digitized and "ran through" a mathematical model which is representative of a desired photographic filter, thereby filtering the frame or shot as desired. The shot may then be converted back to a desired form of picture stock.

In addition to other features, the filtering technology of the present invention has one feature which allows a user to propagate or interpolate any changes effected by the filter mathematical model through other frames of the shot, thereby saving the user much time and effort.

One of the features of the technology is that any reference pictures may be used, either from a film or picture library as mentioned or as developed by an individual director or colorist to meet a particular application, in order to generate the mathematical model which is representative of a desired filter.

Other aspects, advantages, and features of the picture filtering technology of the present invention will become apparent to those skilled in the art from a reading of the following detailed description with reference to the accompanying drawings.

DETAILED DESCRIPTION OF THE PREFERRED EMBODIMENTS

Referring to the drawings, exemplary embodiments of the present invention are shown, illustrating the principles of picture recolorization. Upon reading the following detailed description with reference to the accompanied drawings, those skilled in the film and colorization arts will come to realize various alternative and modified embodiments of those exemplified and described herein. This description provides a foundation of picture recolorization from which these alternatives and modifications stem. Accordingly, rather than provide an exhaustive description of all possible preferred embodiments envisioned by the inventors, the principles of the present invention are exemplified with only the embodiments illustrated by the attached drawings and elucidated by the following description.

Figure 1:
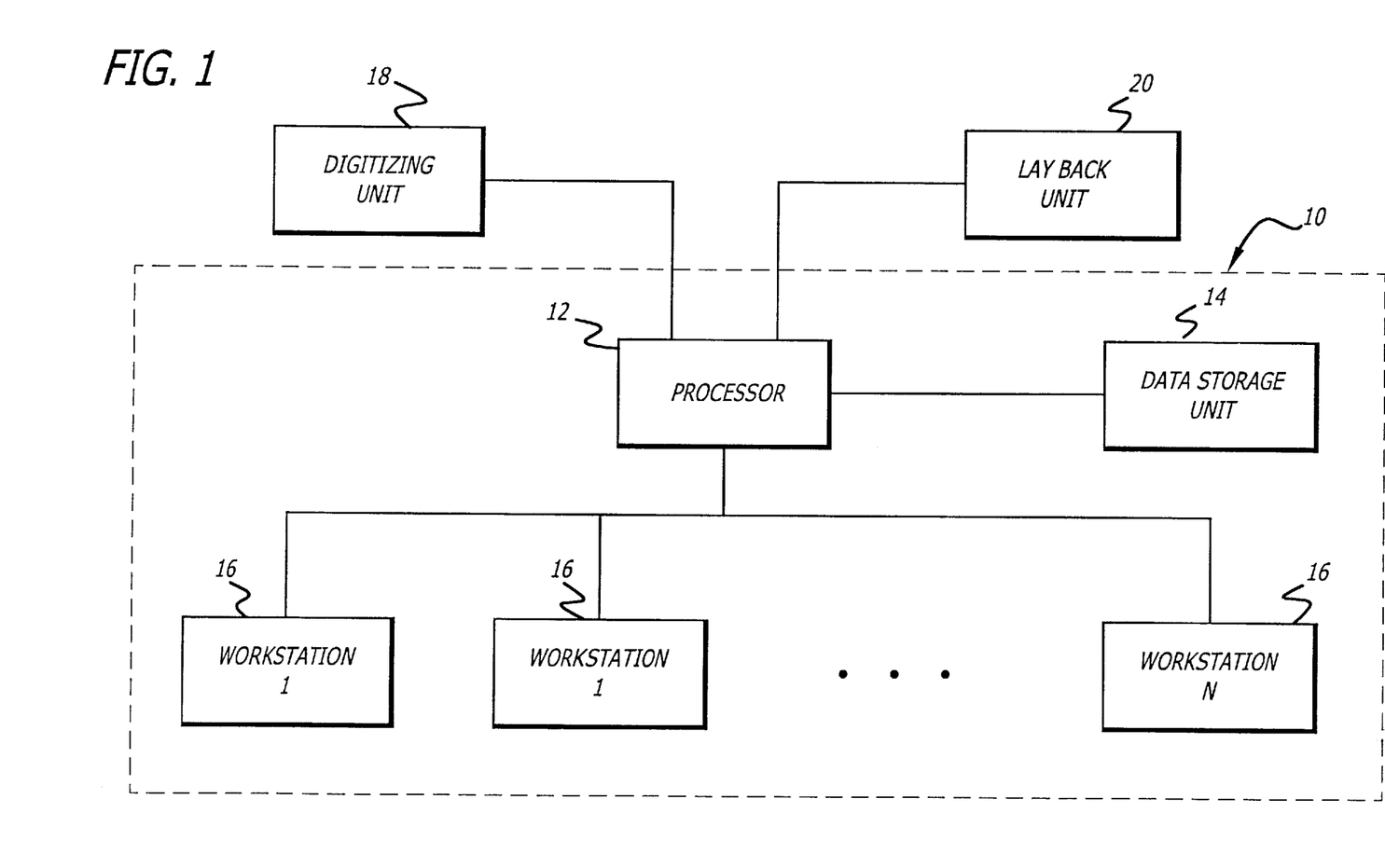
FIG. 1 is a block diagram of a multiple workstation computer recolorization network illustrating certain principles of the present invention.

FIG. 1 generally shows a multiple workstation computer network 10 including a central processor unit 12 such as a mainframe computer in communication with a data storage unit 14 and a plurality of terminals or workstations 16. Each of the workstations 16 may have any combination of the user interface devices available on the market, but it is preferable for each workstation 16 to include at least a keyboard with a mouse and a video display. Digitization pads and the like may also be employed in the workstations 16. The data storage unit 14 may take on any desired form available on the market, but as colorization processes require large amounts of data storage space, the data storage unit 14 should be capable of storing data on the magnitude of thousands of megabytes (or gigabytes) or millions of megabytes (or terabytes). The market currently provides either magnetic tape storage systems, magnetic disk systems, or optical disc systems which are capable of storing such voluminous capacity. It follows that it is preferable for the main processor 12 to have data compression capability to efficiently handle this large amount of data. Furthermore, each workstation 16 as well as the processor 12 preferably has dedicated random-access memory (RAM) capability for further efficient use of the picture recolorization process disclosed herein.

In a commercial implementation of the picture recolorization technology of the present invention, the color-on-color network 10 may be broken down or segmented into dedicated function groups or "work bays" in which personnel performing similar tasks in the recolorization process are located. For example, colorists, that is, artists or other skilled animators who are experts on color, may be assigned a certain number of workstations 16; users who are skilled in the task of masking or drawing polygons around objects to be recolored may be assigned to a number of workstations 16; and users who are skilled in the algorithmic function of interpolating, which is an efficiency function of estimating or fitting color and mask data to unedited frames of a film, may be assigned to further workstations 16. In any case, any number of defined function workstations 16 may be manipulated by colorists and users in an efficient orchestration of the recolorization technology disclosed herein.

At this point a number of definitions of terms in the art will be given in order to allow those people not specifically skilled in the art to understand more fully the principles set forth herein. The concept of color is defined by a combination of the three following qualities: hue, which indicates the gradation of color or the attribute of colors that permits them to be classed as red, yellow, green, blue, or an intermediate color between any contiguous pair of these colors; intensity, which relates to the density or brightness qualities of a color; and saturation, which relates to chromatic purity (i.e., freedom from dilution with white) or the degree of difference from the gray having the same lightness. Additional words used in the art of colorization include: luminance, which relates to the black-and-white aspect of a frame; and chrominance, which is the hue and saturation component of a color. When speaking of movies or films and videos, picture indicates a generic term for any motion picture including movie, film, video, or the like; frame refers to a single instantaneous exposure of film of the series of exposures on a length of a picture; and shot refers to an unedited or continuous sequence of frames between edited breaks or cuts of the picture (i.e., "scenes" in a picture) or, in other words, an unbroken view of a given scene from a single camera perspective.

More industry-specific terminology includes: diffusion, which relates to the blending or grading of color at the border of two differently color objects; precedence, which determines which objects in a frame are more forward or rearward (i.e., closer or farther from a view's perspective) than other objects; and baseplane which is the background plane or the most rearward object to be masked in a frame.

The definition of the concept called colorspace is somewhat more complicated than those already given. Color television and color computer monitors (i.e., display units and monitors) normally operate in RGB colorspace, RGB standing for the additive primary colors red, green, and blue. These three colors correspond to the three "guns" of color displays and, in addition, roughly correspond to the three types of color receptors in the human eye. As colorization processes add color to existing monochromatic images or modify color of polychromatic images as set forth herein, the colorspace known as "YCrCb" is preferably chosen for internal representation and manipulation because YCrCb colorspace separates luminance information from chrominance information.

In YCrCb colorspace, "Y" represents the monochrome or the luminance portion of the image, and "Cr" and "Cb" respectively represent the red portion and the blue portion of the color image, which are read as "red chrominance" and "blue chrominance." [The color green is not stored because green can be algebraically computed from the other three colors, which is known in the art.] In order to visualize the concept of YCrCb colorspace more clearly, if the Cr-Cb space were displayed in two-dimensional Cartesian coordinates, gray would be in the center (0,0) with the Cr and Cb values both equal to zero. The further from the origin that a point may move (i.e., the Y or luminance value) the more progressive the intensity of the color would become, with the hue of the color being defined as the angle with the origin as its vertex. In addition, a color recipe is a set of luminance points, which includes at least black and white, for any given substantially homogeneous color area or mask.

Having provide these basic colorization terms and concepts, picture recolorization technology according to the present invention generally entails a method for modifying the color of existing polychromatic or color picture stock with luminance-to-chrominance mapping techniques. Generally speaking, picture recolorization provides a method for modifying colors of a frame of polychromatic picture stock by firstly digitizing the frame and then identifying at least one area of the frame which is substantially homogeneous in color. At this point, the luminance values of each digital unit, e.g., a pixel, of the substantially homogeneous area are ascertained, with the luminance values mapped to a predetermined set of color values. The luminance values are then modified as desired by a colorist to create a particular effect. The modified digitized frame is then converted back to a desired picture stock. All of these tasks may be accomplished at the various dedicated workstations 16 of the recolorization system 10. The substantive description of the present invention now follows.

Digitizing Picture Stock

Figure 2:
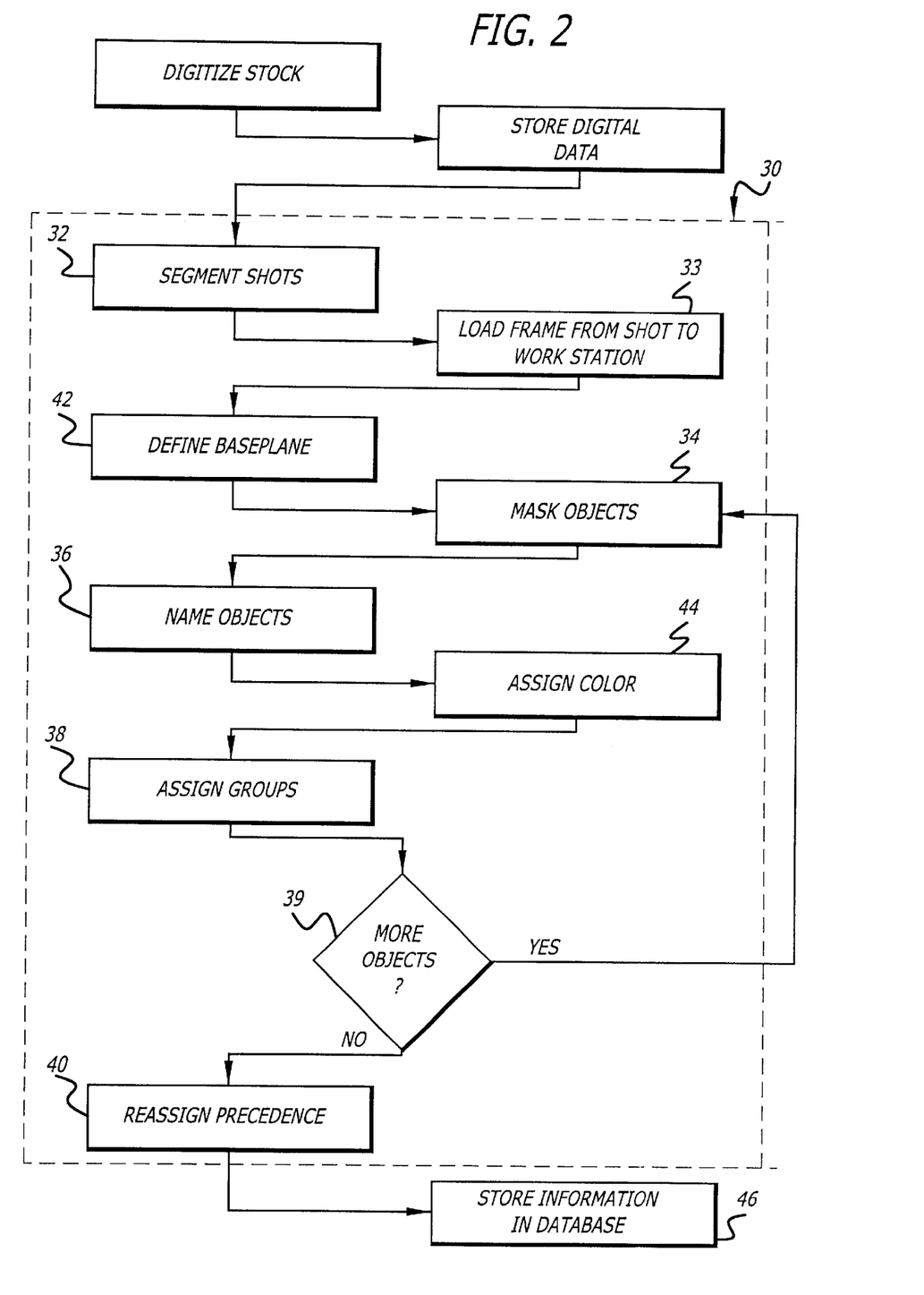
FIG. 2 is a block diagram illustrating a colorization process for picture stock, particularly showing the creation of a picture database.

With additional reference to FIG. 2, the colorization of black-and-white pictures or the recolorization of the color pictures, in a general sense, firstly involves capturing, which is the process of digitizing, frame by frame, picture stock with a digitizing unit 18 into individual pixels or digital units as shown in FIG. 1 and represented by block 22 in FIG. 2. The original stock may be any known monochromatic or polychromatic type of picture stock, including celluloid motion picture films, television series or films (for example, 4,096 lines per frame), television commercials, music videos, and so on. Further examples of source media include RGB-format videotape, D1 digital videotape, NTSC videotape (i.e., videotape with 525 lines per frame), PAL videotape (i.e., 625 lines per frame), analog and digital videotape in general, and even single art still and photographic slides as well. As the stock is digitized frame by frame in the digitizing unit 18, the data are transmitted to the processor 12 of the computer network 10 and stored in the data storage unit 14. If the original stock is celluloid or a video master print, then it is preferable to transfer this valuable stock to D1 videotape first so that the original celluloid or video master is left untouched by the digitizing unit and completely intact for archival purposes. At any time in the colorization or recolorization process, the digital data contained in the data storage unit 14 may be laid back or converted to a desired form of picture stock or the original form of the picture stock by a lay back unit 20, which will be discussed further below.

Creating a Database

Once the digital data from the digitized film stock 22 is stored in the data storage unit 14, as represented by block 28, a database is created as shown by block 30. The digital data stored in the storage unit 14 represent the entire film, video, or movie, which is essentially an summation of identifiable continuous shots. Accordingly, the digital data are segmented into each original individual shot, as shown by block 32, with each shot identified. Each shot in turn is essentially a set of individual continuous frames which have been taken from a given camera perspective and have a shared set of objects and/or characters, which may or may not move about the frames during the course of the shot. Each frame may then also be thought of as a collection of these objects, which may be actors and actresses, animals, automobiles, trees, fixtures, and so on. After the shots are segmented 32, a frame from the shot is downloaded to one of the workstations 16 so that a colorist may work thereon, as represented by block 33.

A baseplane is an object with a color recipe which covers the entire frame and is at the lowest precedence, e.g., precedence 1. The baseplane is typically the "background" (for example, the sky, the ocean, or the wall of a room) across which all other objects move or of which all other objects are in front. By defining a baseplane (block 42), the overall color to be applied to a frame may be quickly applied. The baseplane may be defined essentially at any point in the process, often beneficially immediately after the frame is downloaded 33 to the workstation 16 and a colorist is commencing work thereon.

A process called masking takes each of these objects and delineates a certain definable color region, which is called a mask and shown by block 34. Objects to be masked are generally selected from each frame based upon homogeneity of color; that is, the object has substantially the same color throughout, or the color of the object is substantially constant throughout. The selected and masked objects may then be assigned names (block 36) for consistent reference throughout the colorization or recolorization process. As can be realized, some objects may be a combination of several masks. For example, if the object in question is a person, then the various required masks would include the person's shirt, pants, shoes, face, hair, hands, and so on. This process is called grouping and is represented by block 38. Therefore, each object may be thought of as a group of masks. Grouping allows parallel or simultaneous editing of related masks which increases productivity of the colorist working at one of the workstations 16. Further, by combining the masked objects or elements of a principal object into a unified group for functions such as moving and resealing, the colorist can reduce the amount of operations required to track objects in motion.

In a preferred embodiment of the present invention, there may be, for example, 1,024 possible masks available per frame of footage (footage being defined as a series of frames which typically appear at a rate of 24 frames per second in motion pictures). Accordingly, many of the commands for editing masks (which will be discussed in detail below) may be performed on a group of masks and not each individual mask, thereby greatly reducing the amount of manual labor required to edit frames with a user operating a computer mouse, for example.

In addition, a colorist may also define hierarchically masks within a given group, allowing the colorist to manipulate subgroups of a principal object. However, skilled colorists typically mask objects, after defining the baseplane, from most rearward to most forward in the frame, thereby automatically assigning hierarchical precedence values to the masks. However, if desired, the precedence may be reassigned (block 40) before the frame data are stored in the database.

Masks are typically generated or defined by drawing polygons, i.e., closed plane figures bounded by at least three straight lines, around the substantially homogeneous color region or area of each object. As can be realized, using more lines for the defining or masking of a polygon results in a more accurate tracing or definition of the subject object. Any operation which defines a substantially homogeneous color region of a frame may be considered a masking operation, including splining techniques and specifying vertices that correspond to specific pixels or digital units in the object image.

Each of the object masks and/or each of the masks included in a mask group of an object is then assigned a color or color recipe, as shown by block 44. Color assignment 44 is a step typically performed by colorists who are artists or other specially trained animators. For example, in colorizing an old black-and-white film, the colorists have to research what color a particular costume would have been at the time the film was made or the era in which the film takes place. Accordingly, a colorist or art designer designates the colors in a select number of frames which are representative of images necessary to establish the artistic look of the entire film or project. These colorists rely on extensive reference materials such as color research books, photographs, set and costume information, and archival files from a movie studio or the Academy of Motion Pictures Library. All this information plays an integral part in the decisions regarding color.

In designating or assigning the color of the masked objects in selected representative frames, the colorist assigns chrominance values or a color recipe to every mask, each of which may have the same color recipe or a different color recipe, thereby creating "art stills" from the frames for each shot or scene. Individual colors are selected from a palette of approximately 16.8 million colors. These colors comprise a color wheel defined by luminance and chrominance values in which a colorist may operate to generate a specific desired color. Once each object is assigned a color 44, this color information as well as all of the rest of the information heretofore defined by a user at a workstation 16 is stored in the database in the data storage unit 14, as shown by block 46. Accordingly, the recolorization process is able to modify colors of films that were originally undesirable. However, the recolorization process of the present invention creates intentionally unrealistic colors for special effects or to correct flawed colors of specific objects. Furthermore, the picture recolorization technology of the present invention recolors or selectively alters existing colors of pictures that were originally in color and not necessarily in black and white originally.

Masks may be assigned an attribute known as diffusion which relates to the falloff of values along the border of the mask (i.e., along the lines of the defining polygon), or the merging of two different colors assigned to adjacent masks. Diffusion "softens" the borders or edges of the mask, allowing for smoother blending or grading of the colorization effect of the object with the surrounding objects. Diffusion further allows a user to assign a color recipe to a blurry or out-of-focus object such as smoke which would otherwise be nearly impossible to colorize accurately and convincingly.

To diffuse a selected mask of an out-of-focus object, each pixel or digital unit in the mask is replaced with the proportion of the pixels in a box centered on the given pixel that are inside the outline or polygon of the mask. This assigns the border of the mask (i.e., polygon) a value of about 0.5 which gradiently increases to 1.0 for a pixel a distance of about one-half of the defined box inside the mask, and which gradiently decreases to 0.0 for a pixel an equal distance on the outside of the mask. The size of the box determines the level or degree of diffusion, which is controlled by the colorist at the workstation 16. During the actual color application, the diffused value is used to determine the portion of the existing color for a given pixel that is replaced by the color from the colormap of the mask in question. This results in one half of the color of the polygonal mask at the border thereof comes from the mask itself and the other half comes from any mask "behind" the mask in question, which may be either the baseplane or another mask having a lower precedence value.

Diffusing the color of masks in this manner provides many advantages. First of all, a user has the ability to color blurry and out-of-focus objects realistically and convincingly. More importantly, diffusion greatly reduces the accuracy required by the user or colorist in drawing polygons around objects, mainly because the receptors in the eye that detect edges are monochromatic, and the color receptors of the eye have comparatively poor spatial resolution. It has been found that this diffusing masking effect allows a colorist to color most human faces with only six points or vertices of a polygon (i.e., using only a hexagon). A further advantage of diffusion is the simulation of realistic light reflection and highlights along the edges of curved objects, resulting in particularly realistic colorization of faces.

After an initial object in the frame has been masked and assigned a color, the colorist may continued the masking/assigning color process for as many objects as desired, as shown by the decision block of FIG. 2.

As mentioned above, masks may be reassigned a precedence value, as represented by block 40, which allows masks to overlap each other without interference as the masked objects move relative to each other in prior or subsequent frames. This allows efficient tracking of an objects's motion as the object moves spatially from frame to frame within a scene or shot, possibly occluding other objects in the frame. The ability to overlap masks increases the colorist's efficiency as objects change position in each subsequent frame. For example, if a particular shot involves a series of frames with a ball moving behind a tree, the tree mask should be assigned a higher precedence than the ball mask so that the ball mask can move behind the tree in succeeding frames without changing the shape of the mask or without the ball interfering with the tree. Without this precedence system, masks would have to fit together like jigsaw pieces which would require their shape to be changed by the colorist with each subsequent frame. Such a process would require tremendous user effort and time.

Blocks or steps 32 to 46 have been described in an exemplary order but may in reality take place in any order as desired by a user utilizing one of the workstations 16 of the computer system 10. In addition, once a frame has been downloaded (block 33) to the workstation 16, any one of the steps or any combination of the steps may be implemented by a user, with that particular information created by the user saved or stored in the database 46. Furthermore, this process may be implemented by a group of users at the workstations 16 with individual users dedicated to a particular task; for example, one user would only segment or separate shots 32 and then store this information in the database 46, and another user would then access this stored shot information to perform the masking of objects 34 and the naming of objects 36, thereafter storing the masking information in the database 46 in the data storage unit 14. Colorist would then perform the sophisticated and artistic process of recolorization. This information may then in turn be accessed by any number of users at the workstations 16 to perform the various tasks outlined by the block diagram of FIG. 2.

Upon completion of the database or any portion of the database which has had color assigned to the object masks 44, the following recolorization technology may be implemented.

Luminance-to-Chrominance Mapping

The application or assignment of color to masks of the frame images is done with a proprietary luminance-to-chrominance mapping. In the case of colorizing black-and-white source material, luminance is derived from the range of gray values in the black-and-white image. In the case of modifying the color of a mask in a color frame, luminance is derived from a weighted average of the color components. The amount of luminance resolution is dependent on the number of bits used for sampling the source image. For example, 8-bit sampling yields 256 levels of gray, while 12-bit sampling yields 4,096 levels of gray.

The basic source of color for the colorization system is the colorspace or colormap, which is a complete and continuous mapping of luminance to chrominance. For every luminance value from black to white, the colormap contains the chrominance values that could be applied. However, because of the large number of luminance values representable, which may be at least 256, it would be quite tedious for the user to create a colormap from scratch. Therefore, the colorization system has a higher-level abstraction called a color recipe, which is a set of luminance points which includes at least black and white and which the compiler 10 uses to generate a colormap. In other words, the color recipe allows a colorist to specify the color for selected points on the luminance range and have these selected points influence color assignments of nearby luminance values.

The luminance values of every pixel or digital unit a mask which is substantially homogeneous in color are determined. This may be accomplished by integrating the area of the mask and generating a histogram. The resulting histogram displays by percentage the number of pixels or digital units having a particular luminance or intensity value. The colorist can then accurately determine the chrominance values of the mask in question. A colormap may then be generated based on the histogram from which the colorist may modify the luminance values or the chrominance values of the mask to a very specific degree when applying these modified values to the mask, thereby modifying the color of the mask to a specific degree. Further, by integrating the luminance values, the colorist is able to determine what range of chrominance values are viable choices for assigning to the mask.

By interpolating the color values of the color recipe, the specific chrominance values applied to a given luminance value are determined. Assuming Y (luminance) values run from 0 to 100, and Cr and Cb (chrominance) values run for −50 to 50, an example of a complete color recipe may be as follows:

TABLE I

| Y | Cr | Cb | Color |
|---|---|---|---|
| 0 | 0 | 0 | black |
| 20 | 20 | −20 | brown |
| 50 | −20 | −20 | green |
| 80 | −20 | 20 | light blue |
| 100 | 0 | 0 | white |

If the color recipe of Table I were created by a colorist at a workstation 16 of the computer system 10, the colorist would first generate a colormap from the color recipe by interpolating all the intermediate Y values or a line of intermediate Y values not already represented. For example, in the above case, the colormap would contain the following entries halfway between the entries in the recipe:

TABLE II

| Y | Cr | Cb | Color |
|---|---|---|---|
| 10 | 10 | −10 | dark brown |
| 35 | 0 | −20 | greenish-brown |
| 65 | −20 | 0 | aquamarine |
| 90 | −10 | 10 | very light blue |

However, for every luminance value there may not necessarily be chrominance values which apply. For example, if a colorist desires to alter the color of an object having an extremely bright yellow color to be a deep forest green, the luminance value would be too high or "bright" for any combination of chrominance values to yield the desired deep forest green color. Therefore, the luminance value would need to be modified, specifically decreased, in order to implement the desired effect. This is called luminance-to-luminance mapping or luminance modification. Accordingly, luminance modification remaps selected luminance ranges. This allows both inverse mapping of luminance as well as linear redistribution of luminance values. Luminance modification further enables a colorist to put any desired color in a mask regardless of the initial luminance value of the mask, or to increase the contrast of a washed out area of a mask, e.g., from overexposure.

A given digital unit of a mask may have the attribute of transparency which specifies for a given luminance value what portion of the color from a mask behind or having a lower precedence than the mask in question is retained, even in undiffused areas of the polygonal mask (e.g., the center). Transparency allows the specified luminance range to have no color applied at all. Under conditions where an object's luminance contrasts with the surrounding area, "loose" masking (i.e., less perimetrically accurate masking, or masking with a polygon having fewer sides) may be used, thereby reducing the amount of time and effort applied by a user. The luminance range of the surrounding area can be set as transparent with the effect of color application only to the object of interest. The transparency level may also be interpolated with surrounding color recipe points. Normally it is preferable for transparency to be zero which prevents the color of lower-precedent objects to be seen in the mask in question. However, there are at least two instances, for example, where transparency is very useful, the first when assigning color recipes to masked objects that are themselves transparent such as smoke and glass. The second useful application is less obvious as discussed below.

There are times when objects in a shot or scene stand out in great contrast to the background or baseplane, for example, a brightly lit face against a dark room or a shadowed face against a bright sky. In these special cases it is convenient to use a loose mask around the object and to use a color recipe to separate the foreground from the background. Referring to the bright face example, a colorist at a workstation 16 would set high luminance values corresponding to the bright face to have skin color with no transparency while setting lower luminance values corresponding to the dark room to have no color but full transparency. In the example, the polygonal mask could extend well outside the face because it would have no effect on the lower luminance areas, thereby greatly reducing the effort of the colorist.

Defining an Initial Keyframe

Figure 3:
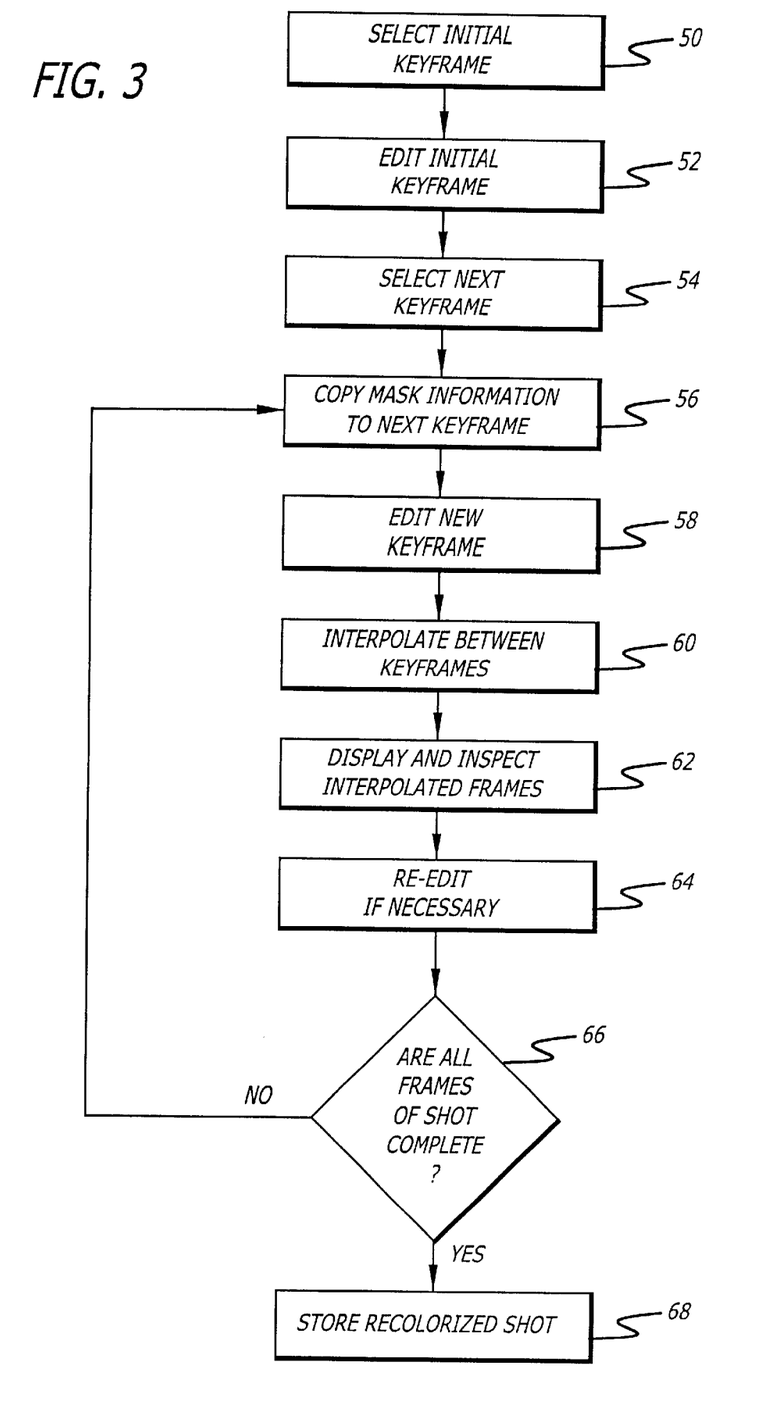
FIG. 3 is a block diagram illustrating a frame interpolation process used in a colorization process according to the present invention.
Figure 4:
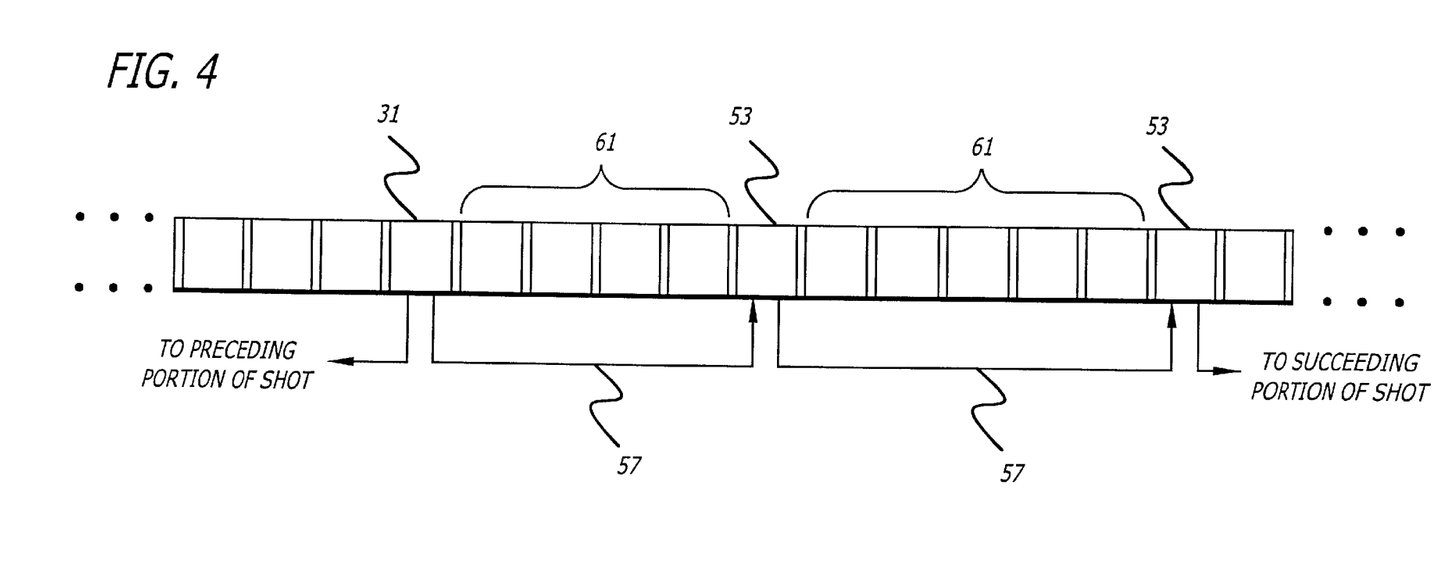
FIG. 4 is a schematic diagram illustrating a frame interpolation process of the present invention.

Referring to FIGS. 3 and 4, after the colorists have defined and assigned colors or chrominance values for each mask of each object 44, thereby creating the art still for that particular shot, an initial keyframe 51 may be selected and defined (block 50) from a defined shot in the database which is essentially the "prototype" for all the other frames in that shot as shown in FIG. 4. The initial keyframe 51 does not necessarily need to be the first frame of the shot. However, the initial keyframe is preferably the most representative or indicative frame of the shot, that is, includes most if not all of the defined and masked objects in the most indicative arrangement of the shot as possible. The different mask values of the art still stored in the database as defined by the colorists may then be copied to the initial keyframe 51. Alternatively, the colorist may mask objects himself or herself at this time and only copy previously defined color recipes to that masked object. These tasks are known as editing tasks and are represented by block 52.

The mask grouping and assigned precedence of the masks in the initial keyframe ensure efficient processing throughout the shot. With judicious initial assignment of the mask precedence, a user is able to fit masks to objects with a minimum of further precedence changes. All mask manipulation functions can be accessed on a group level, including precedence changes. Further, any frame in any shot may be saved for use as a reference in another shot, which is useful, for example, when a pair of shots alternate back and forth as a result of the film editing. Further, this saving feature allows colors and masks to be copied to the current frame which is being edited. The colors and masks of a particular frame may be copied singly, in groups, or in totality.

A dedicated file for the initial keyframe 51 may then be stored in the system 10, which file has all the information about coloring that particular frame, including the shape, position, and color recipe of all the polygonal masks. Essentially this frame becomes an anchor, providing a frame of reference for similar frames on either side thereof.

Interpolating a Set of Frames in a Shot

In order to increase user efficiency in colorizing a particular shot, the areas of the masks of a frame may be interpolated on a frame-to-frame color conversion basis. Having defined 50 the initial keyframe 51, a user may define further keyframes 53 (block 54), either forward or backward from the initial keyframe 51, which are representative of a particular sequence of frames of the shot.

The second keyframe 53 is chosen and colored with the same mask information as the initial keyframe 51 by copying the information from the initial keyframe file 51 to this keyframe (block 56 and arrow 57 of FIG. 4). If the camera taking the particular shot or if objects within the shot have moved, then the same mask/color information will not exactly fit. However, the effort required to edit the next keyframe 53 by adjusting the incorrectly matching polygons (and possibly deleting objects or masks no longer in the shot and creating new masks) is far less than if the colorist had to start each frame from scratch. The compiler 12 may then interpolate (block 60) the masks over the intermediary frames 61 between specified keyframes. The interpolation may be linear or some other user-specified mathematic algorithm. The precedence of the masks may also be changed at the various keyframes.

When at least two keyframes have been assigned mask information, one of the intermediary frames 61 located halfway between the two keyframes 51 and 53 is copied with the mask information averaged from the two bounding keyframes 51 and 53. Linear interpolation is preferably used on the absolute position of each pixel or digital unit in each mask to determine the corresponding pixel in the intermediary frame 61 in question. Accordingly, the intermediary frame or frames 61 will most likely require less editing than the next selected keyframe. This process of recursively splitting ever-shrinking spans of the shot is repeated until there are no further modifications needed or, until the experienced colorist feels that when all the remaining frames are interpolated and colored, the error in the result will not be detectable, which may be done by displaying and inspecting the interpolation result (block 62) on the display monitor at the workstation 16.

The receptors in the human eye which are sensitive to color have a relatively slow response time, allowing errors that are visible in a still frame to be unobservable at a normal rate of playback. For this reason, all recolorized material is checked for masking errors at normal speed to ensure that unnecessary work is not performed. It turns out that this technique, combined with the fact that there is actually very little change between successive frames of motion picture, allows the colorist to actually only touch on average one frame in five frames of actual material. However, the colorist may-re-edit the keyframe or make new keyframes from the interpolated frames if needed (block 64).

An actual shot-editing process may proceed as follows. An initial keyframe 51 is selected with the color and mask information of the art stills stored in the database in the data storage unit 14 copied to the initial keyframe 51, which initial keyframe is shown a display terminal at a workstation 16. The colorist pulls a mask with a desired color attribute from the art stills of the shot from the database and applies the mask to the corresponding mask within the frame (generally at block 52). The color and mask information may then be copied (arrow 57) to second frame 53. The color and mask information may need to be slightly edited to fit the second frame, which is now defined as a keyframe. This second keyframe may subsequently be copied to a third frame 53 (as particularly shown in FIG. 4 and represented by block 66), edited or modified, and so on throughout the entire shot. Therefore, based on the information of the keyframes, the computer or processor 12 then interpolates the color and mask information for all of the frames 61 between each of the selected keyframes, thereby rendering all the frames of the shot colorized. The quality of the interpolation may then be immediately checked by playing back the shot (generally at block 62) on the display of the workstation 16 or playing back segments of video to access the color/mask generation. If more keyframes need to be defined to more accurately recolorize the shot, a user may then do so. As each shot is colorized to a satisfactory degree, the shot is stored 68 and compiled onto a master tape in the proper order for the completion of the film or project.

After all the shots of the film are colorized, a quality control process is conducted to ensure that the entire project matches or meets the original design. In order to do so, each shot is balanced for color relationship to the adjacent shots with the quality of the coloring needing to meet a predetermined standard. Further, if need be, broadcast specifications of the edited color master stock must be met. If the colorized digital material meets all the quality standards set in place, the digital shots are laid back to a useable format in the lay back unit 20, either digital-to-digital such as on D1 videotape or digital-to-analog such as celluloid. A time code may also be applied which matches the time code of the original master stock.

In addition to the shape and position of masked objects, linear interpolation may be applied to all other colorization parameters for which it is applicable, including all the values in the color recipes and the mask diffusion levels. This added interpolation capability allows the colorization of shots with changing lighting or focus without the discontinuities that would otherwise result. Precedence values are generally not interpolated, but the relative precedence of objects can change between frames, as in the extreme example of a dance scene. Accommodating such a scene is simply a matter of making sure that when the precedence values of different masks are changed that the individual masks are not in contact in order to avoid any discontinuity.

Additional Features

Another feature of the recolorization process is the ability to change dynamically the number of points defining a polygon around an object. An object's shape may change significantly over the course of a shot, or the size of the object changes dramatically within the image while the shape of the masked object stays relatively constant and unchanged (e.g., panning in or out). Either of these situations are capable of affecting the optimum number of points used to define the coloring polygonal mask. The recolorization process of the present invention can interpolate between masks having a different number of points in the defining polygon as long as the points that match are known. For example, a polygon of an object in the background of one frame distance may have, for example, only five points to accurately define the mask, but as the shot proceeds and the object moves toward the foreground, more and more points are needed in order to accurately define the polygon to the mask. Therefore, the colorist may copy the five points to the mask in the desired frame, and the compiler 12 interpolates between the frames by adding (or subtracting) points in the polygon as needed.

Expanding upon additional features of reshaping technology, a user may add a point, therefore adding a line, to a polygon by identifying an existing line of the polygon and selecting the line, for example, a computer mouse at the user interface workstation 16. A point is automatically assigned to the middle of the line, i.e., the midpoint, thereby dividing the line into two new lines. The point may then be dragged along the line, thereby shortening and lengthening the two new lines accordingly, to a desired position as ascertained by the user.

A point may also be removed from a polygon, thereby removing one of the sides of the polygon (e.g., going from a hexagon to a pentagon), by selecting a point with, for example, a mouse. When the point is removed, a line is automatically drawn between the two points of the two lines which shared the point that was removed.

Further, in order to reduce the number of sides of a polygon, instead of removing a single point, an entire line may also be removed. A user selects and removes a line. The two lines which were adjacent to the line that was moved are then automatically joined at their open endpoints created by the removal of the line. A new point of the polygon is defined at the point where the two adjacent lines join.

Such polygon modification and reshaping techniques are efficiently enhanced by the automatic propagation feature of the present invention. Once, for example, a point is removed from a line to reduce the number of sides of a polygon, the compiler 12 automatically performs the same operation on all the frames of that particular shot, thereby saving the user much time and effort. This propagation feature applies to all the reshaping features described herein.

A further feature of the present invention involves techniques known as scenecasting. Once all the mask colors have been applied to the image, a final color may optionally be added to the image. This final color is, by definition, fully transparent and used for such effects as giving a warm glow to a late afternoon scene or a blue wash to a night shot. In other words, scenecasting enables a user to selectively tint an entire frame, i.e., the collective lot of masks, for certain lighting effects. In terms of productivity, scenecasting eliminates the need to readjust or modify all the colors of the masks of the frame.

Yet another feature of the picture recolorization technology of the present invention is automatic edge or object detection as an alternative method in masking. In contrast to drawing polygons, edge detection masks regions of substantially homogeneous color base on the color of the region, not the shape. The edge detection technology permits a user to preselect certain parameters for the computer to track an object and automatically redraw the surrounding masks over a series of frames. Using a single pixel or digital data unit as a starting point, the extent or total area of the object may be determined by using a luminance range set.

In applying edge detection, an initial extent or area of the region is determined by taking the range of luminance values within a small arbitrary area around a "seed point" selected by the user with a computer mouse, for example. All the pixels or digital data units which have values contained in the luminance range set in the neighborhood of the seed point are selected using a simple seed-fill algorithm, which may then be highlighted on the display monitor. Using color modifying devices such as "sliders" to vary the two initial boundary values of the luminance range set, the color of the region can be adjusted to encompass the desired area having luminance values within the luminance range set. The extent or area of the region then defines the mask of which the color may now be modified.

Color-on-Color Processing or Picture Recolorization

Color-on-color processing permits colorists under the direction of, for example, the film's director, to recolor or color enhance picture footage previously shot in color. For example, the color of an actor's shirt in a scene may be changed, leaving all other colors untouched. The cost of recolorizing a particular shot with the technology of the present invention is substantially lower than the production costs involved in reshooting an undesirably colored scene.

Figure 5:
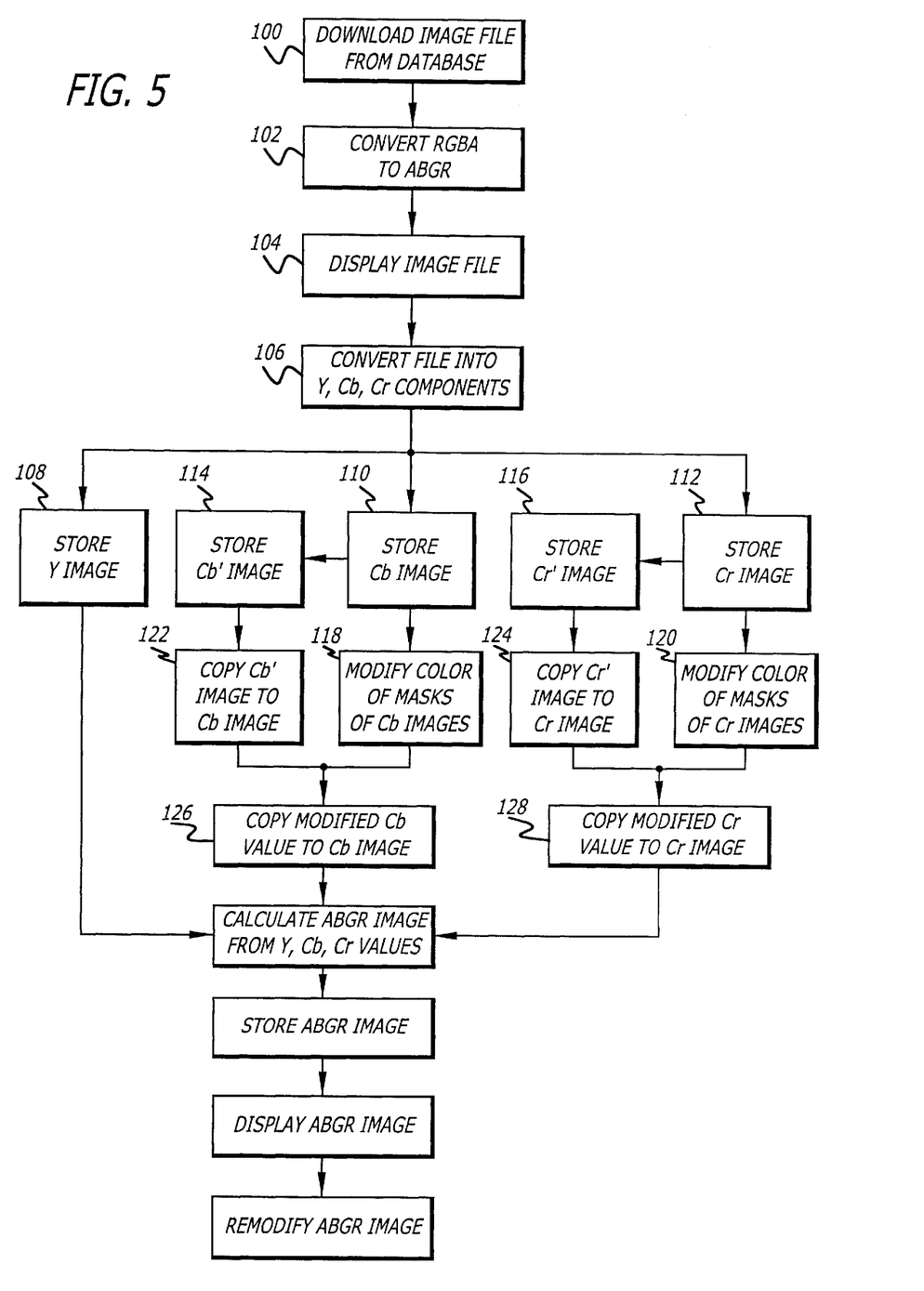
FIG. 5 is a block diagram of a recolorization process illustrating principles of the present invention.

Referring to FIG. 5, a process for modifying digitized color images through the assignment of new chrominance values to the luminance values of the source frame, shot, or picture is illustrated. From one of the workstations 16, a user downloads a digitized image file from the data storage unit 14, as represented by block 100. The source image or image file is generally assumed to be comprised of pixels each of which is stored in Red-Green-Blue-Alpha (RGBA) format. The four components of each pixel or digital unit (i.e., the red component, the green component, the blue component, and the alpha component) may be represented by eight bits each for a total of 32 contiguous bits per pixel.

After the image file is loaded at one of the workstations 16, if the display buffer of the workstation 16 cannot readily accept and directly display an image file in RGBA format, the image file may be converted from the RGBA format into Alpha-Blue-Green-Red (ABGR) format, as represented by block 102. ABGR format allows efficient display of the image on the display monitor of the workstation 16, as shown by block 104.

Upon any necessary image-file conversion and display, each pixel or digital unit of the image file is translated into three different components, namely, luminance, blue chrominance, and red chrominance, which are respectively represented as Y, Cb, and Cr. This conversion process is represented by block 106. After the image file has been converted 106, the respective components are stored as a Y image, a Cb image, and a Cr image in three separate buffers, as represented by blocks 108, 110, and 112, respectively.

At this point in the color-on-color or recolorization process, there are four separate sets of data which a user at a workstation 16 may manipulate: the ABGR (or RGBA) image file, the Y image, the Cb image, and the Cr image. Memory either at the processor 12, the data storage unit 14, or the workstation 16 is now allocated to store copies of the Cb image and the Cr image, which are denoted as the Cb' image and the Cr' image and respectively shown by blocks 114 and 116. This copying step preserves those regions of the individual frame or picture which are not to be manipulated and are to retain their original colors.

The Cb and Cr images may now be modified (blocks 118 and 120, respectively) by adjusting the Cr and the Cb component of the pixels within a polygonal mask to be modified. The Cr and Cb components are adjustable within the range of values mapped from the luminance values of the respective pixels or digital units.

After a user has modified the Cr and Cb images to a desired level in a particular mask area or in any number of mask areas of the images, the data in the Cb' image file and in the Cr' image file are copied to the Cb image file and the Cr image file, respectively, to recreate the original colors of the masks that were not modified, as represented by blocks 122 and 124. At this point, the modified chrominance values of each polygonal mask are copied over the corresponding pixel or digital-unit positions in the Cr and Cb buffers, as shown by blocks 126 and 128, respectively. This combination of the original image and the modified mask or masks leaves for further use the luminance (Y) image, which has not been modified, and the modified blue and red chrominance (Cb and Cr) images, part or all of which chrominance images may have been modified.

The Y, Cr, and Cb values for each pixel or digital unit may then be used to calculate a corresponding ABGR image (block 130) using any well-known algorithm. This now-modified ABGR image may be stored in the database in the data storage unit 14 (block 132) and displayed on a display monitor of one the user's workstation 16 (block 134). If the user deems that the image is in need of further adjustment or modification, the ABGR image may then be remodified (block 136) by repeating the above-described steps from either block 100 or block 106.

Accordingly, the color-on-color processing or picture recolorization technology of the present invention enables a colorist to alter or modify existing colors of films, repair damaged color films, edit colors of a specific shot of a film, create special effects with color modification, and/or otherwise enhance footage of pictures previously shot in color.

Filtering

There are times when it is desired to modify or enhance the color of the entire digitized frame. One example of this is scenecasting as described above. Another example of modifying the color of the entire frame is filtering. As the name implies, filtering techniques according to the present invention for digital modification of picture stock involves applying mathematical filters to a digitized scene, frame, or shot. The mathematical filters are equivalent to the filters used in photography or cinematography, such as polarizing filters, star filters, bow-tie filters, various chromatic filters, and other filters with which those skilled in the art of photography are familiar.

The filtering technology may be beneficially applied to amend or enhance various situations. For example, if a director of photography mistakenly used an inappropriate filter or no filter at all, rather than reshoot the entire shot, the picture stock may be digitized and passed through a mathematical model which mathematically represents the desired filter. The digitally filtered image may then be converted back to picture stock for normal use. In addition, if a director is not satisfied with a particular shot, the shot may be digitized and have a desired mathematical filter applied thereto to yield the desired effect.

Figure 6:
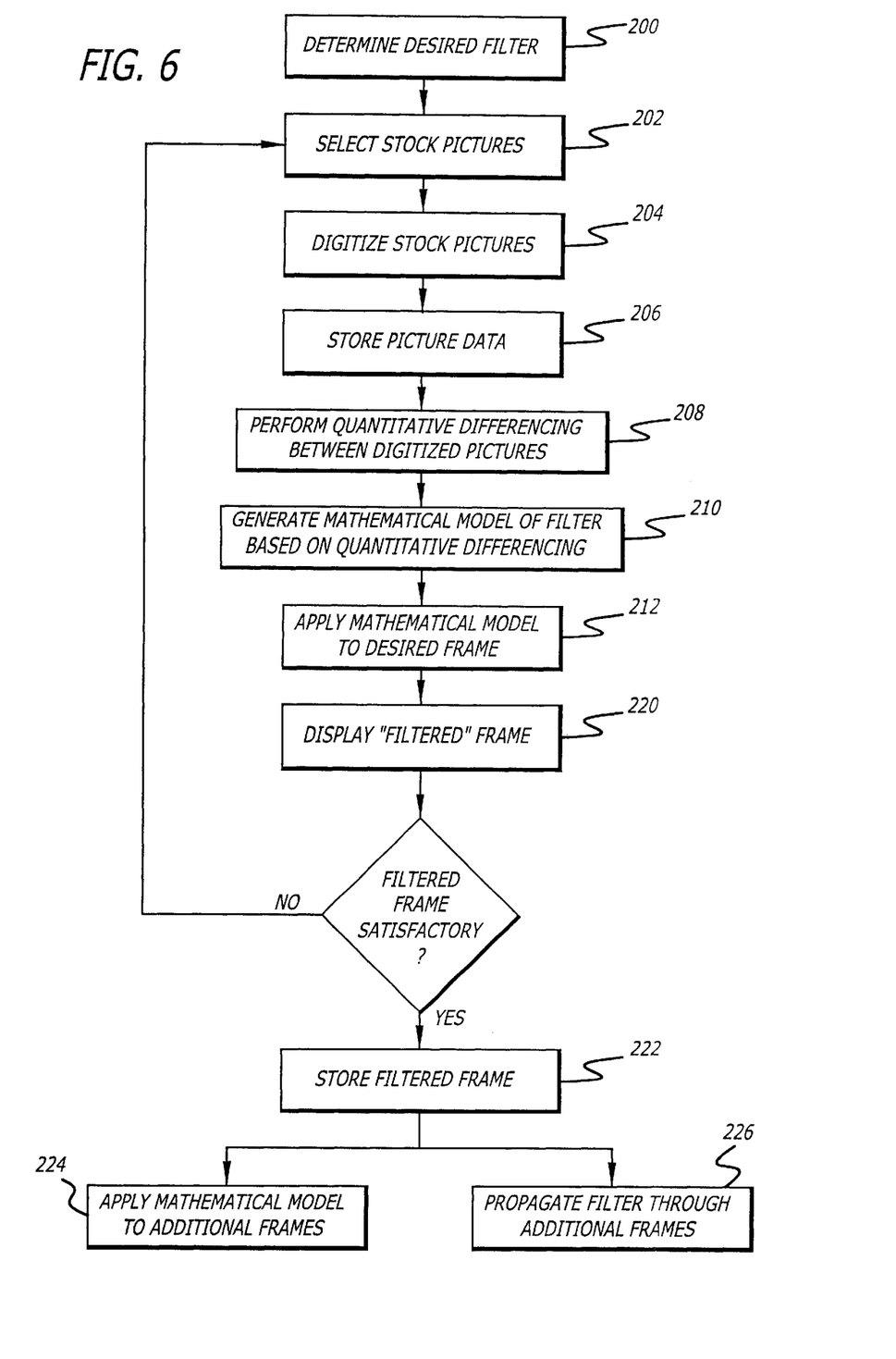
FIG. 6 is a block diagram of a filtering process illustrating principles of the present invention.

More specifically, referring to FIG. 6, a filtering process according to filtering and picture colorization technology of the present invention is shown. The first step in the filtering process is to determine what type of filter is to be applied to the frame or shot of the picture stock, as represented by block 200. For example, a director may desire a day shot to appear as a night shot. Once this is determine, stock pictures are selected from a film library such as the Electronic Institute of America (EIA) which houses picture libraries representative of filters in use in photography, pictures which provide a standard for filters used in industry and photography. For the ease of discussion, two stock pictures are selected although any number of representative pictures may be used. The stock pictures are substantially identical pictures regarding subject matter and lighting, but one of the pictures is shot with the desired filter and the other picture is shot without the desired filter. This selection process is represented by block 202. Alternatively, the user or colorist may also generate filtered and unfiltered stock pictures with a desired filter with his or her own photographic equipment.

The pictures are then digitized by any known means, for example, with a scanner or in the digitizing unit 18, and is represented by block 204. The digitized pictures may be stored in the storage unit 14 for immediate and future use (block 206) in the computer system 10. The digitized pictures respectively comprise a set of pixels which correspond to one another; in other words, for every pixel or digital data unit of the digitized picture without a filter, there is a pixel or digital data unit which corresponds thereto of the digitized picture shot with a filter.

At this point a quantitative analysis of the two digitized pictures is conducted. This entails a pixel-by-pixel comparison of the values of the digitized picture with the filter and the digitized picture without the filter. The quantitative difference between a preferred digital value each of the corresponding pixels (or digital data unit) is determined and may then be stored. For many filter applications, the luminance values of the corresponding pixels are compared and quantitatively differentiated. This is sufficient for black-and-white picture stock and many types of polychromatic picture stock as well. However, other values of the digitized filtered and non-filtered pictures may be compared, including chrominance values, RGBA values, and so on, depending upon the desired or required complexity of the quantitative analysis. Each value or variable of the quantitative difference is known as a channel. Accordingly, single-channel analysis is the most simple and generally involves only luminance values. This quantitative analysis described above is represented by block 208.

The quantitative difference in, for example, the luminance value of each pixel then represents the effect that the filter has on the unfiltered picture. The total set of difference values for the digitized pictures forms a set of difference data, each datum of which represents the difference value of each pixel. A mathematical model is then generated based on this set of difference data, as represented by block 210. The mathematical model is a mathematical representation of the filter or of how the filter affects a picture. Depending upon the value of the pixels which ware quantitatively differentiated, the mathematical model may then be applied to any other digital picture to modify the same value of the pixels thereof.

More specifically, if the mathematical model is based on luminance values, then when the mathematical model is applied to an "unfiltered" digital image, the luminance values of the unfiltered image will be modified by the same amount that a corresponding photographic filter would modify an image taken with a still or motion camera. In a sense, the mathematical model represents a black box through which digital data may pass and be affected (or modified) in the same way light passing through a photographic filter is affected. If the mathematical model is luminance based, then the digital data will only have luminance values modified to the extent represented by the difference between the luminance values of the filtered and unfiltered pictures. Accordingly, block 212 represents applying the generated mathematical model to the desired frame loaded at one of the workstations 16. The frame may already have any number of masks or may be a "raw" frame of unmodified picture stock. The application of the mathematical model will modify the value of the pixels on which quantitative difference is based of each of the frame pixels regardless of any prior modification.

Figure 7:
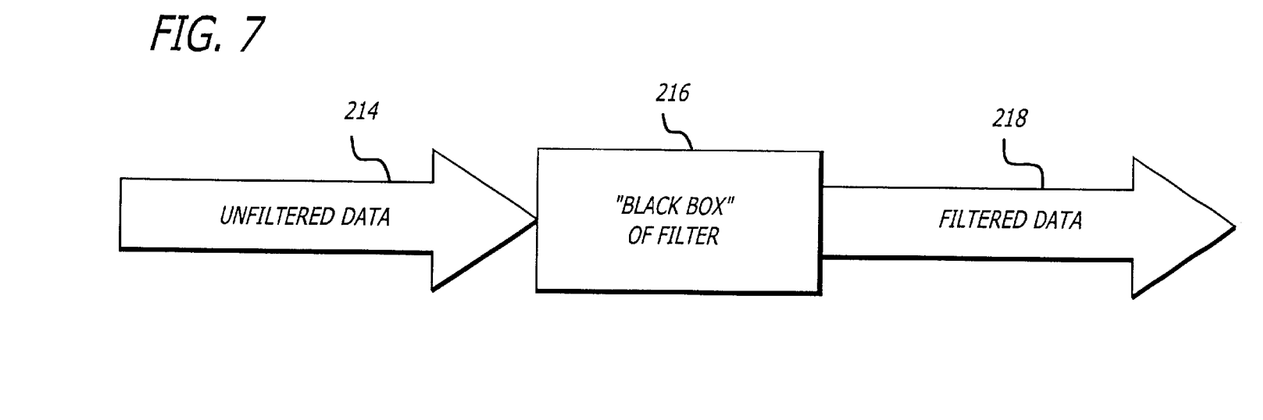
FIG. 7 is a schematic diagram of a step in the filtering process of the present invention.

With additional reference to FIG. 7, the mathematical model essentially represents a black box through which the digitized data of the frame to be modified pass, as mentioned earlier. The unfiltered data 214 are sent or fed through the mathematical model of the filter 216 to yield the filtered data 218. One way in which this is accomplished is by means of a mapping function. For example, each luminance value of the unfiltered pixel is assigned a factor or multiplier which will, when multiplied with the luminance value, substantially equate that value to the corresponding filtered luminance value. Accordingly, this factor or multiplier is essentially a difference factor. In applying this filtering technique to a digitized frame, as the unfiltered data 214 enter the mathematical-model black box 216, which takes place at the processor 12, the luminance value of each of the unfiltered digital units or pixels is determined. Each luminance value is compared to the luminance values of the unfiltered digitized reference picture and multiplied by the factor or multiplier needed to substantially equate the luminance value with the filter reference value. By applying this mathematical model to each of the pixels, the entire digitized image or frame is filtered. Further, if a multiple-channel quantitative differencing was performed, each channel (i.e., color variable such as red chrominance, blue chrominance, etc.) of the digitized frame will be modified or normalized to the corresponding filtered value.

An alternative to this mapping function is that the mathematical model or the "black box" of the mathematical model may be an equation. The equation would be a function of any number of desired variables such a luminance and chrominance values which substantially represents the desired photographic filter. After the generation of the equation based upon the quantitative differencing values, the user could then "fine tune" the equation so that the filtered digital data yield the desired effect. Other types of mathematical models may be possible such as curve fitting techniques and so on.

After the digital data units or pixels of the digitized picture have been "filtered," the now-filtered frame may be displayed at the workstation 16, as represented by block 220. If the colorist or director is satisfied with the results of the filtering process, the filtered digitized frame may then be stored in the data storage unit 14, as shown by block 222. If the filtering process did not yield a satisfactory filtered frame, then the colorist may go back to the picture library containing filtered and unfiltered pictures and select additional or more representative pictures of the frame which is desired to be modified. Further, if a satisfactory mathematical model has been generated, the mathematical model of the filter may be applied to additional frames (block 224) or the compiler 10 may propagate or interpolate the changes of the one frame through the other frames of the shot (block 226). After completing any number of the described steps, the colorist may then store the completed filtered frames in the storage unit 14 and convert these digitized images back to a desired picture stock.

The foregoing detailed description has focussed on exemplary embodiments which generally illustrate the principles of recolorization technology of the present invention, with a number of preferred or advantageous variations being provided. However, as previously mentioned, from the foregoing teachings those skilled in the art will realize obvious modifications and variations of the recolorization processes and technology . Accordingly, these alternative embodiments are also within the principles of the present invention as defined by the appended claims.

What is claimed is:

1. A method for modifying colors of a digitized frame of picture stock comprising the steps of:

digitizing an unfiltered reference picture, thereby generating a set of representative digital units, each of the digital units having a value;

digitizing a filtered reference picture substantially identical in subject matter to the unfiltered reference picture, thereby generating a set of representative digital units, each of the digital units corresponding to a digital unit of the unfiltered set of digital units and having a value;

quantitative differencing between the value of each corresponding digital unit of the filtered and unfiltered sets of digital units;

generating a mathematical model representative of the quantitative difference between the value of each of the digital units of the filtered and unfiltered sets of digital units; and applying the mathematical model to the digitized frame.

* * * * *